(12) United States Patent
Passian

(10) Patent No.: US 11,855,697 B2
(45) Date of Patent: Dec. 26, 2023

(54) EDGE-COMPUTING WITH ENHANCED STANDOFF SENSORS

(71) Applicant: UT-Battelle, LLC, Oak Ridge, TN (US)

(72) Inventor: Ali Passian, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 154 days.

(21) Appl. No.: 17/381,826

(22) Filed: Jul. 21, 2021

(65) Prior Publication Data

US 2022/0038185 A1 Feb. 3, 2022

Related U.S. Application Data

(60) Provisional application No. 63/059,097, filed on Jul. 30, 2020.

(51) Int. Cl.
| | |
|---|---|
| *H04B 10/27* | (2013.01) |
| *H04B 10/50* | (2013.01) |
| *G01N 21/63* | (2006.01) |
| *G01N 21/65* | (2006.01) |
| *H04W 84/06* | (2009.01) |

(52) U.S. Cl.
CPC ....... *H04B 10/5057* (2013.01); *G01N 21/636* (2013.01); *G01N 21/65* (2013.01); *H04B 10/27* (2013.01); *H04W 84/06* (2013.01)

(58) Field of Classification Search
CPC .... H04B 10/5057; H04B 10/50; H04B 10/27; G01N 21/636; G01N 21/63; G01N 21/65; G01N 2021/1793; G01N 2021/17; G01N 2201/126; G01N 21/1717; G01N 21/17; H04W 84/06
See application file for complete search history.

(56) References Cited

U.S. PATENT DOCUMENTS

| | | | |
|---|---|---|---|
| 2012/0122084 A1* | 5/2012 | Wagner | G01N 15/147 435/6.1 |
| 2016/0274025 A1* | 9/2016 | Skibo | G06N 3/006 |
| 2019/0187020 A1* | 6/2019 | Green | G08B 21/14 |

FOREIGN PATENT DOCUMENTS

CN 105823732 B * 7/2021 ............. G01N 21/17

* cited by examiner

*Primary Examiner* — Natalie Huls
*Assistant Examiner* — James I Burris
(74) *Attorney, Agent, or Firm* — LEMPIA SUMMERFIELD KATZ LLC

(57) ABSTRACT

A system senses analytes through one or more sensors that detect or measure a physical characteristic. The one or more sensor generate a spectroscopic-data signal corresponding to the detection. An edge device communicatively couples the one or more sensors that communicatively couples a wide-area network coupling a cloud service. The edge device includes a data acquisition device that receives spectroscopic data signals from the one or more sensor and a processor that processes the spectroscopic-data signals to identify an analyte. The edge device also includes a transceiver that transmits data identifying the analytes to the cloud service.

18 Claims, 8 Drawing Sheets

EDGE-COMPUTING WITH ENHANCED STANDOFF SENSORS

PRIORITY CLAIM

This application claims priority to U.S. Provisional Patent Application No. 63/059,097 filed Jul. 30, 2020, titled "A Multimodal Edge-Computing-Enhanced Standoff Sensor for the Detection of Pathogens, Drugs, Explosives, and Other Hazardous Materials," which is herein incorporated by reference.

STATEMENT REGARDING FEDERALLY SPONSORED RESEARCH AND DEVELOPMENT

This invention was made with United States government support under Contract No. DE-AC05-00OR22725 awarded by the United States Department of Energy. The United States government has certain rights in the inventions.

BACKGROUND

Technical Field

This disclosure relates to detections, and more specifically to non-contact detections and screening.

Related Art

Screening often relies on physical inspections. People and objects are funneled through checkpoints where physical examinations occur. As they move through checkpoints, outwear and electronic devices are removed, which slows down the inspection process. False alarms are frequent as are intrusive searches and pat-downs.

Many physical inspections are expensive and cause unnecessary alarm. They are not integrated with other screening tools and do not reduce the overall risk beyond a check point. Often the processes do not record outcomes or detect small threats. More time is invested in searching than observing a wider range of characteristics and behaviors that identify threats.

DETAILED DESCRIPTION

Data is frequently generated at the edge of a network. Data's widespread availability is often served by computing resources in a cloud. Many cloud services (referred to as the cloud) distribute functions across geographic locations and share resources to achieve economies of scale. As big data is generated, structured and unstructured data can inundate cloud platforms reducing its bandwidth and speed. The end result is much of the data isn't processed, network connections fail, insights from lost data is lost, and the cloud become inefficient. Further, there is little privacy when large volumes of data are sent through publicly accessible networks.

To improve performance, the disclosed systems and methods (referred to as a system or systems) execute tasks at the edge of a network. Besides processing small or large volumes of structured and unstructured data and executing off-load workflows, the systems store data in micro-data centers (also called data repositories), distribute processing requests to one or more cloud instances and/or Internet Protocol (IP) addresses, and deliver services to a cloud instance, an IP address and/or to end-users. Using a non-centralized distribution of memory by its micro-data centers and local processors, the edge systems process data in proximity to the data sources efficiently, reliably, and securely through compact, portable, and inexpensive systems. The term edge refers to computing and network systems that are between data sources and the cloud or IP addresses. A cloud comprises a central server or a cluster of independent network servers that operate—and appear to edge clients—as if they were a single server despite being a group. Clustering improves network capacity by, among other things, enabling the servers themselves within a cluster to shift work in order to balance their processing loads. By enabling one or more servers to take over for another in a cluster, clustering enhances network stability and minimizes or eliminates downtime caused by application or system failure.

Figure 1:
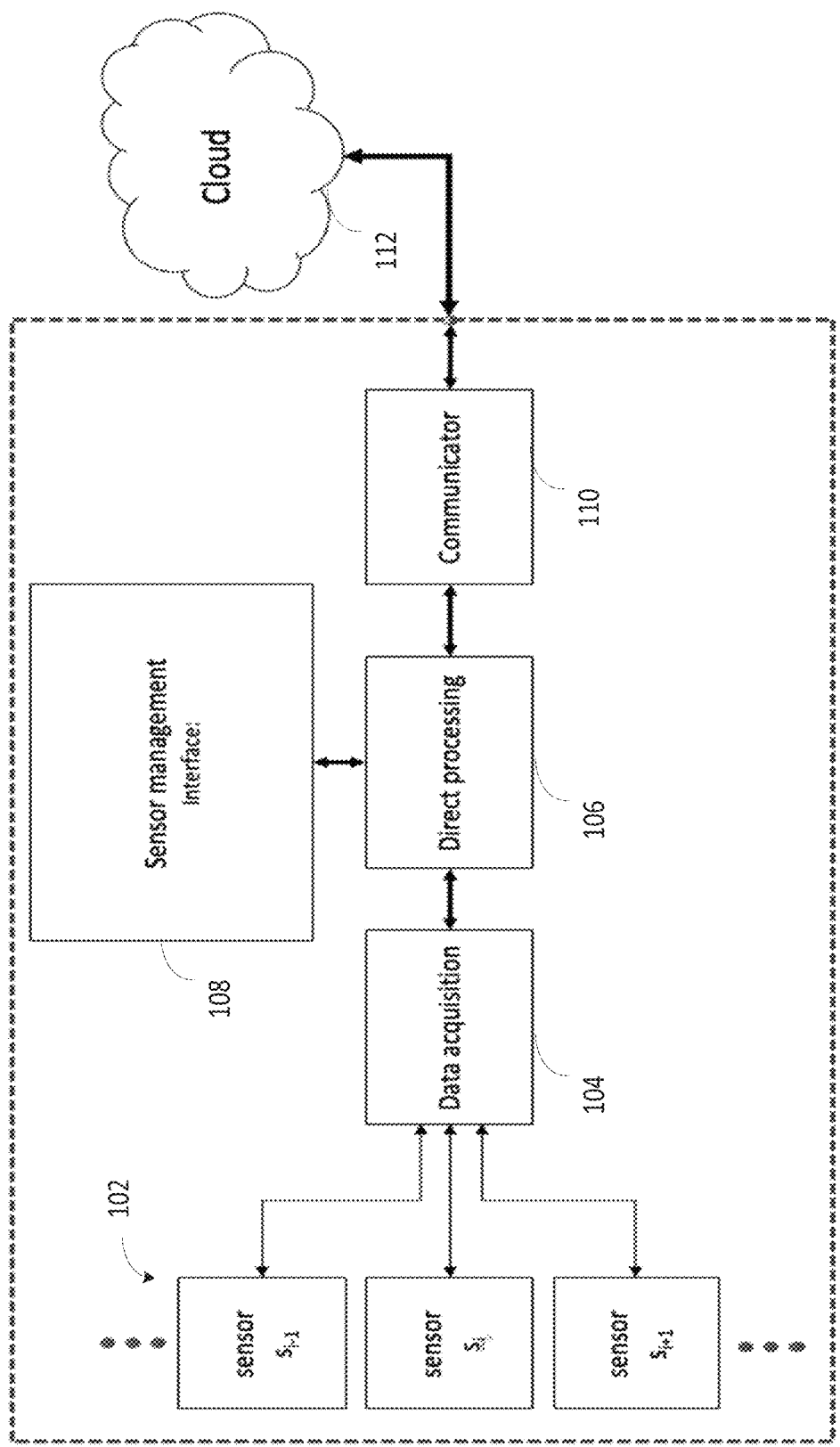
FIG. 1 is an edge computing system.

FIG. 1 illustrates a bi-directional computing stream in an edge computing system. The system includes a plurality of devices or sensors including wireless sensors and/or standoff sensors that detect or measure something by converting non-electrical energy into electrical energy. Some sensors 102 make chemical identifications by generating spectroscopic data to detect explosives, breakdowns in products and materials and/or detect other precursors and analytes where an action or event occurs (e.g., at the scene). Some sensors 102 capture radiation, images and/or videos and generate image-related data that identify threats.

In FIG. 1, one or more sensors 102 (also referred to as a sensor network or sensor module(s)) are standoff sensors that source and/or collect electromagnetic radiation that may be visible (e.g., wavelengths of about 400 to about 700 nanometers) and/or invisible (e.g., wavelengths shorter than 400 nanometers or longer than about 700 nanometers). Some of the sensors 102 may source and/or collect relatively high-energy photons with a wavelength in the approximate range from 0.01 to 10 nanometers. The sensors 102 may include electromagnetic photon-detectors, and/or photodetectors that generate spectrographic signals that represent the visible and/or invisible spectrum ranges.

A data acquisition device or circuit 104 receives the stenographic signals from the sensors 102 and amplifies, attenuates, filters, and in some applications, regenerates portions of the output that is distorted before it is stored in files within a local micro data center. The data acquisition device or circuit 104 converts the conditioned spectrographic signal into discrete word sizes (typically, 8, 16, 32 or 64 bits) called spectrographic data at predetermined resolutions. The spectrographic data are interpreted by an edge processor 106 (also referred to as processor apparatus).

In FIG. 1, a sensor management application interface 108 manages the sensors through the edge processor 106. The sensor management interface 108 enables and/or disables the one or more sensors 102, coordinates the sensor's operation, updates the sensor's software, and/or dynamically coordinate the sensor's operation in real-time. Because of spatial coverage, one or more sensors 102 may continuously track a phenomena that traverses a range of sensors 102 in a large or a small geophonic area (e.g., range from about 10 centimeter to about 10 kilometers). The detection, classification, and tracking of a local and/or non-local event sometimes causes local and/or non-local collaboration among sensors 102.

Aggregation of a multitude of sensor data improves accuracy. Informed selective collaboration of the sensors 102 via the sensor management application interface 108, in contrast to flooding data requests to all of the sensors 102, reduces system latency. The sensor management application interface's 108 sensor collaboration minimize system bandwidth consumption (translating into energy savings) and mitigates the risk of the edge node/link failures. In operation, the sensor management application interface 108 makes intelligent decisions about what and/or how much of a monitored phenomenon should be detected, what should be measured, what sensor or groups of sensors 102 should sense it, and what sensor or groups of sensors 102 should communicate the detection and/or measurement of the phenomena. The sensor management application interface 108 also determines what time a communication occurs between the sensor 102 and edge processor 106. Here, a sensor configuration file and one or more sensor selections are executed at the edge. The sensor management interface 108 makes decisions based on sensed information local to or remote to the system and predetermined logic that is locally executed in real-time. The process(es) enable one or more sensor(s)-to-sensor(s) hand-offs and/or actuations of one or more sensors 102 including those capable of making different detections and/or measurements. The process may adjust how much of a signal should be collected by one or more sensors 102 if a predetermined criterion is not met. The process may also adjust the physical orientation of the sensors 102.

Figure 2:
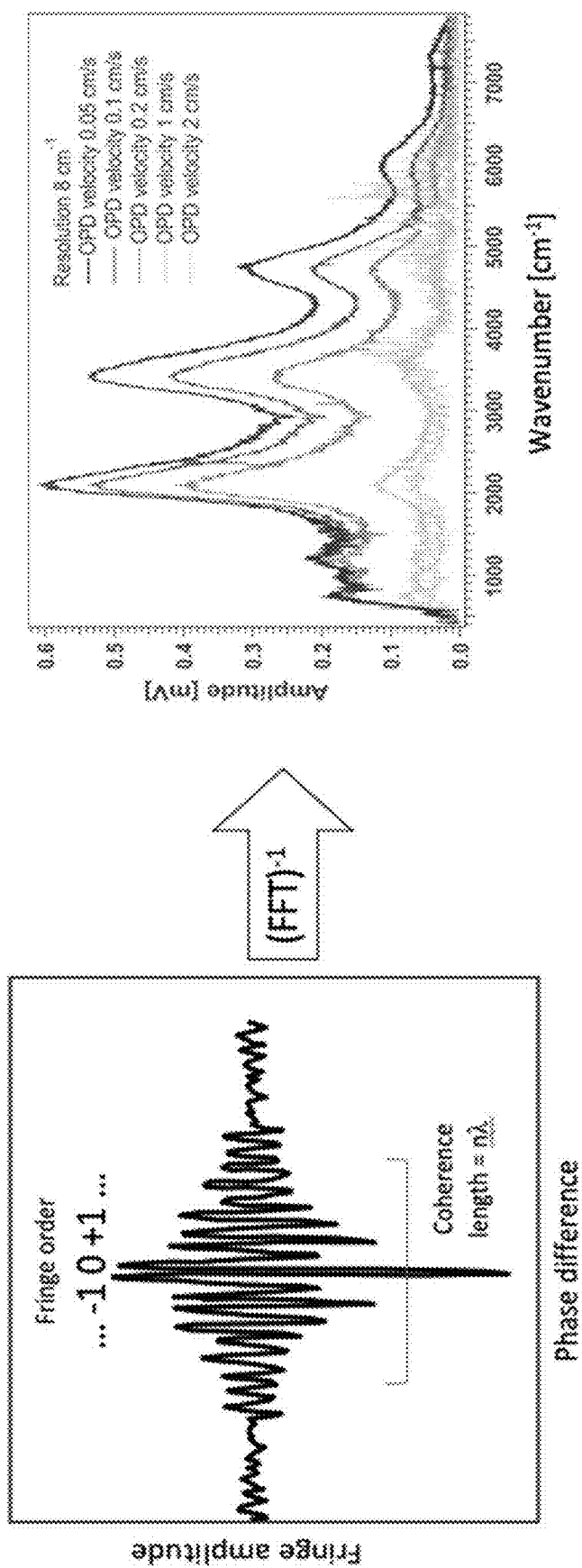
FIG. 2 shows a conversion of a space or time signal into the frequency domain.

In FIG. 1 a transceiver 110 connects the edge processor 106 to the cloud 112 and/or an IP address. The transceiver 110 is part of an edge computing device that may or may not be unitary with the sensors 102. The edge computing is directly connected or communicatively coupled to the cloud 112 through a local-area network (LAN) or a wide-area network (WAN) like the Internet. The transceiver 110 both transmits and receives signals such as information relating to or comprising the identification of analytes, for example. The edge processor 106 executes a spectral analysis of the spectrographic data, and in some applications, converts the spectrographic data into discrete-time samples through an Inverse Fast Fourier Transform (IDFT) as shown in FIG. 2. In some applications, the system applies noise reduction filters to temporal and/or the frequency domain data. When noise is removed in the frequency domain one or more domain filters can be used such as one or more Karhunen-Loève expansion (KLE) domain filters.

Edge processor 106 automatically distributes data, such as spectrographic data and temporal data across one or more cloud 112 instances and/or IP addresses that independently scale. By monitoring the health of its local processing environment and/or its remote target cloud 112 instances and/or IP addresses, the system ensures its own integrity and routes traffic through the transceiver 110 to only healthy and capable cloud targets and/or IP addresses. Local or remote health checks are configured, and in some systems, executed by handshakes with remote resources and/or queries that report cloud and/or IP address metrics (e.g., health and capacity metrics) in response to the requesting system. For example, when edge processor 106 detects or predicts a potential overload or failure condition though a local detection and local comparison of a current operating state or condition to a modeled or expected pre-failure condition, the system can request health checks of a targeted cloud instance or IP address or continue using a trusted remote resource. It then transmits some or all of the spectrographic data to one or more healthy cloud instances, IP address targets, and/or trusted remote resource that have the capacity to receive the data and in some cases, execute the required processing before a failure or an overload condition occurs. When off-boarding some or all of the spectrographic data occurs, the systems stop monitoring and detections, close out its in-process tasks, initiate a reset, and restart a new monitoring and detection session.

Because pre-failure condition models are generated and trained from data generated well before overloading or system failures (e.g., during normal operating periods or sessions), the systems protect against known and unknown causes of overloading and failure. The systems do not need to detect and some do not detect, identify, or know the originating causes of the system's overload condition and/or failure condition to predict and prevent them. The systems are different from systems that identify conditions, causes, or occurrences of these conditions by comparing data generated during overloading and/or failure states, (e.g., during the actual failure or overloading event) against representative data of these states. The disclosed process analyzes internal data before the failure conditions and/or states occurs to determine if and/or when the system is approaching or is about to approach an unstable state.

Because the systems are distributed, meaning they execute analysis independently and remotely, some systems do not rely on other devices to make failure or overload failure predications, and therefore are resistant to the errors and data corruption that comes with remote monitoring that precede such unstable conditions. By the remote nature of the edge computing systems from the cloud 112, the systems do not consume remote processing and memory resources including cloud 112 resources to maintain health. Some systems do not require additional software to avoid known and unknown vulnerabilities because the system strives to maintain a normal operating state instead of striving to detect overload and/or failure conditions or their causes. These turnkey edge computing systems avoid the consumption of remote memory and the processing of resources that would otherwise be needed if remotely monitored.

Figure 3:
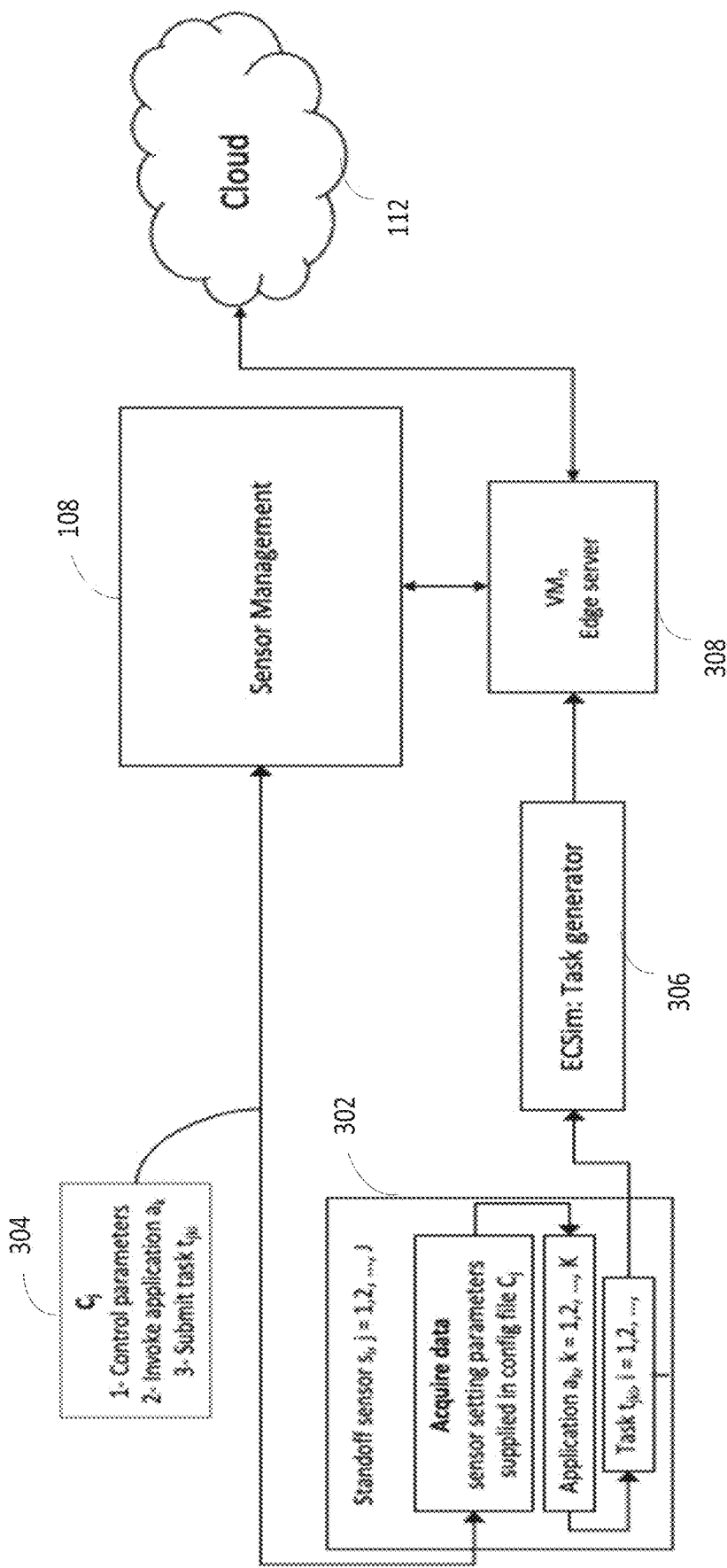
FIG. 3 shows a task generator in an edge computing system

FIG. 3 is an edge computing system that integrates screening tools with wide or small area surveillance. In FIG. 3, data and operations are cached at the edge. Each stand-off sensor 302 and its output are associated with a set of application programs that execute data analysis. The application program perform tasks for an end-user. An end-user comprises an ultimate user of the analysis and/or data or a local virtual machine 308. In FIG. 3, the sensor management application interface 108 programs the configuration state of one or more sensors 102 (not shown) or stand-off sensors 302 using configuration files 304. The sensors 102/302 are programmed to monitor and/or detect phenomena customized to an application.

Because different applications require different tasks to be executed in sequence, a task generator 306 defines the order of execution of the tasks that in some applications occur in response to real-time analysis of the sensor's output. As a given sequence is processed, various tasks are requested and enabled by the task generator 306 and/or virtual machine 308. In some applications, the task generator 306 simulates tasks in response to the data it receives and causes the virtual machine 308 to issue sensor commands through the sensor management application interface 108. The commands may manage sensors, deploy software, manage updates, request data, and/or receive and/or transmit data to the cloud 112. In some applications, the sensor management application interface 108 issue commands that cause multi-laser pump-probe excitation-detection, perform highly precise and rapid interferometric measurements with a wide spectral tunability range (e.g., precision of about 3 mm with an ambiguity range of about 1.5 m in about 200 ms), generate spectroscopic data signals using phase sensitive detection and/or analyze airborne analytes that may be absorbed by surfaces of the sensors 102/302.

Figure 4:
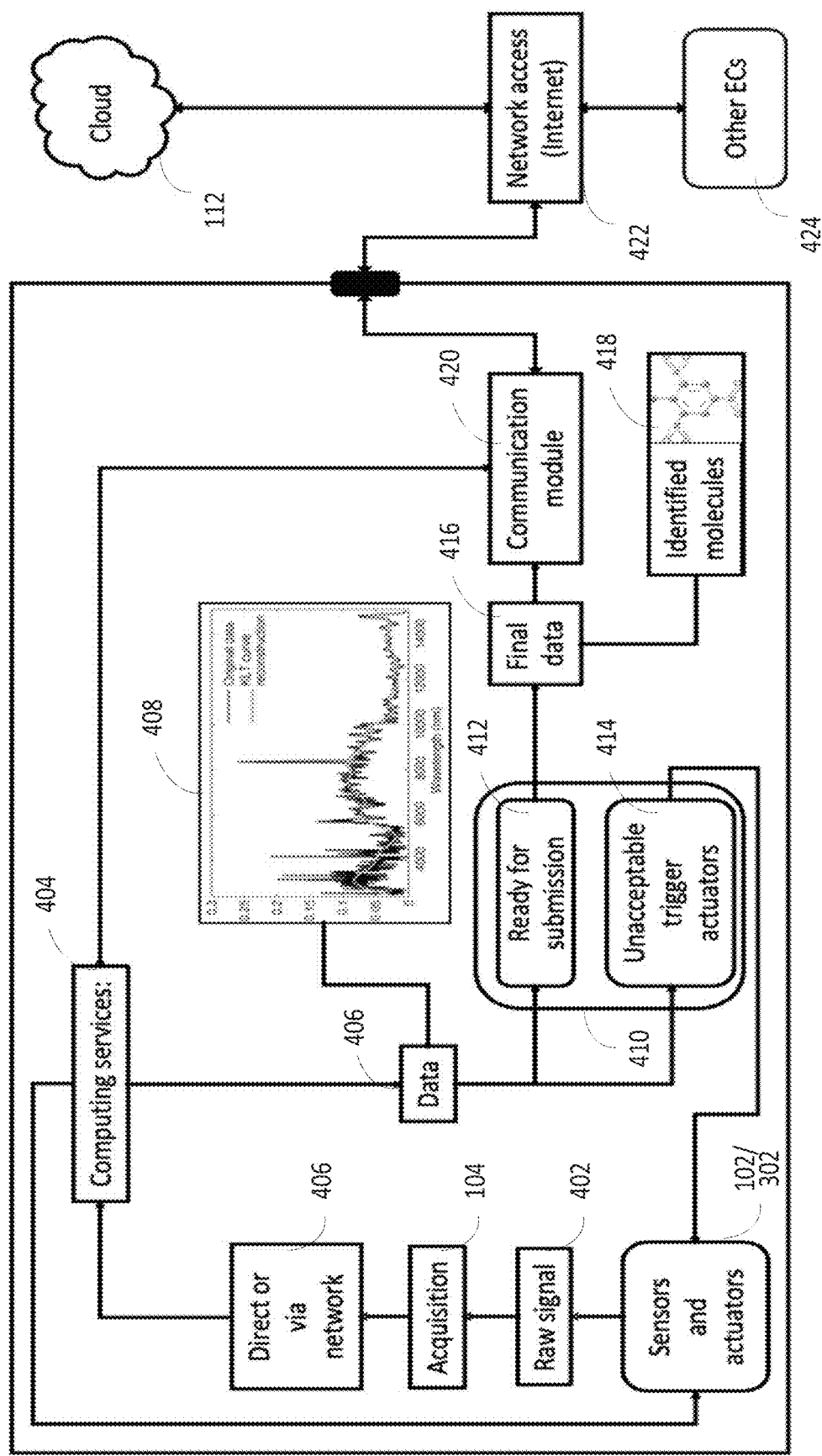
FIG. 4 is another edge computing system.

FIG. 4 is an edge computing system. The system generates discrete or continuous streams of raw spectral data 402, which is acquired by the data acquisition device or circuit 104 and transmitted to the edge-computing infrastructure 404 or an edge processor 106 (not shown) through a local bus 406. The edge computing infrastructure 404 executes a spectral analysis of spectrographic data, and in some applications, converts the spectrographic data into discrete-time samples through an IDFT. In some applications, the system applies noise reduction to the spectral data before the IDFT rendering a noise attenuated signal as shown by the data snapshot 408 captured off the local bus 406 and/or a data node. Noise is removed through a KLE algorithm and/or a Karhunen-Loève transforms (KLT) filter.

In operation, the edge-computing infrastructure 404 makes intelligent decisions 410 about what data is accepted 412, rejected 414, becomes final data 416, and renders identifications 418. The edge-computing infrastructure 404 determines what data is transmitted through a communication module 420, over a network 422, e.g., a LAN or a WAN like the Internet, to the cloud 112 and/or edge computing nodes 424. The edge-computing infrastructure 404 also enables one or more sensor(s)-to-sensor(s) hand-offs or actuations of one or more sensors 102/302 that are capable of making different detections and/or measurements to make the identification, such as the molecular identification 418 shown in FIG. 4. This may occur when the data is judged to be incomplete or missing, which may trigger actuators at 102/302. The edge-computing infrastructure 404 may determine how much of a signal should be collected by the sensors 102/302 and/or adjust their physical orientations.

In an image processing application, the edge based computing systems described detects a phenomena using visible and/or invisible electromagnetic radiation including those within the wavelength ranges described herein. The sensors 102/302 radiate the phenomena with electromagnetic radiation to detect the phenomena's absorption, phase contrast, and/or scattering to the radiation. The edge-computing infrastructure 404 generate three images including an absorption image, a phase contrast image that captures distortions, and image scatter plots that reveal association between image bands and their relationship to characteristics of materials of interest. By this analysis, the edge-computing infrastructure 404 accurately identifies phenomena, such as molecules and/or explosives, for example.

In another use case, the systems make chemical detection of adsorbed and airborne analytes through spectroscopic signal transduction and sensor configurations. An analyte comprises a substance for which chemical constituents are sought. The edge computing system identifies and measure the spectral response of the analytes by acquiring their infrared (IR) spectra. Specifically, the vibrational degrees of freedom of the analyte's molecules are excited in a broadband and/or in a narrowband enabling the detection directly from the scattered IR radiation emanating from the target or indirectly through the changes in thermophysical states of the targeted molecules. In both detections, multiple excitation and readout light are sourced. The sensors execute narrowband and broadband IR standoff spectroscopy with an interferometric multi-laser pump-probe excitation-detection. Coherent (laser) and/or non-coherent (thermal) sources serve the target excitation.

Detection occurs by analyzing scattered IR radiation emanating from a target caused by single or multiple tunable fast-scanning IR lasers, or monitoring feedback from a single or multiple thermal source, or both. The excitation media are either amplitude-modulated and/or generated through interferometry. The underlying excitation mechanism results in a photothermal effect.

In this use case, detections are collections of returned scattered infrared light, yielding a first signal S1 or a second signal S2 returned by a probe beam. Spectral analysis of S1 and S2 allows the edge computing system to reconstruct the spectrum of the target surface molecular content. Signal S1 is detected by a micro electro-mechanical system detector and signal S2 is detected by an avalanche photodiode and are subsequently transformed into spectral components by a fast Fourier transform (FFT) and then analyzed. In some use cases S1 and S2 are amplitude modulated. Both signals are detected via phase sensitive measurements (with lock-in amplifiers). The probe beams may comprise single vis-NIR beams that are either amplitude-modulated and/or interferometric. In some systems, the interferometric beams are based on frequency modulation that provide non-contact vibration measurements through laser Doppler vibrometry (LDV).

Figure 5:
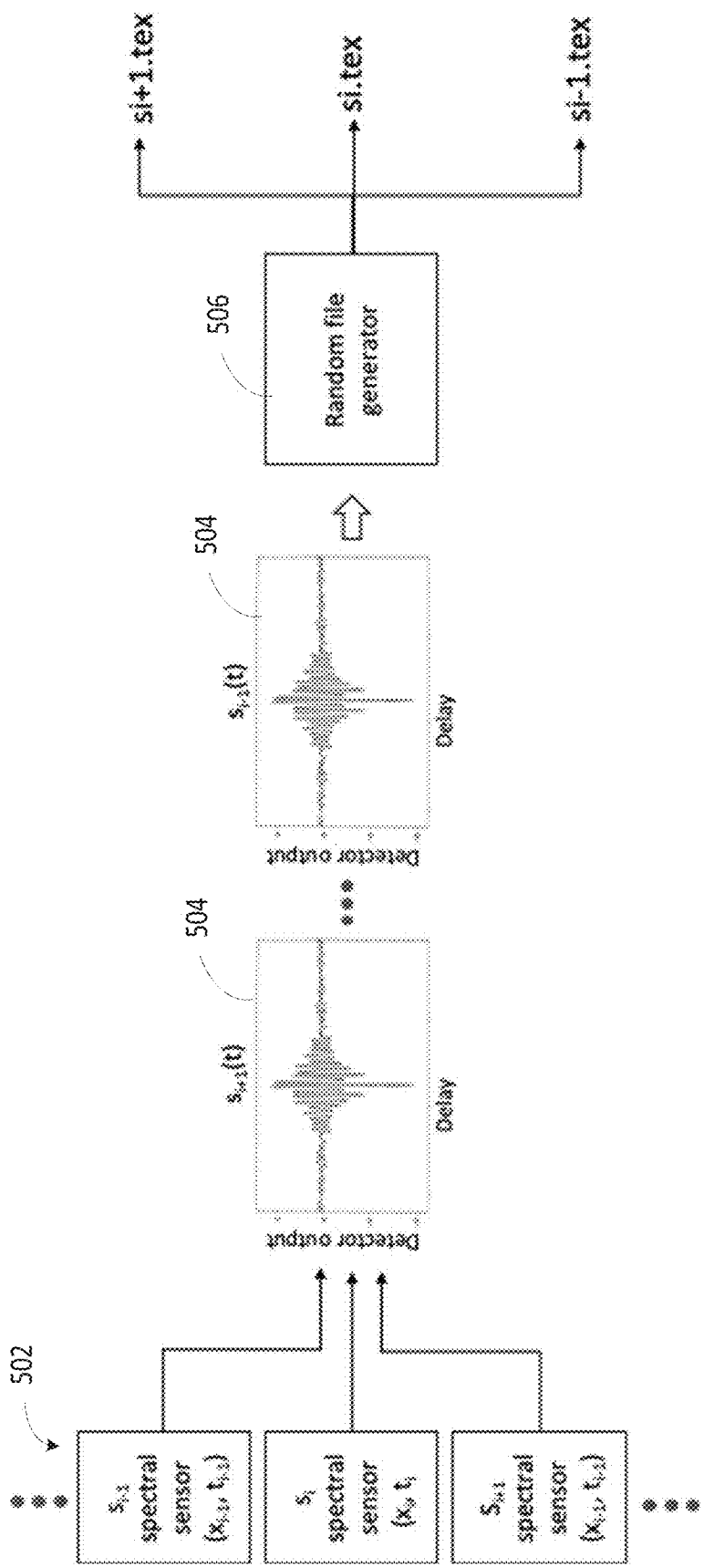
FIG. 5 shows the routing of interferograms through a data acquisition device in an edge computing system.

FIG. 5 shows the routing of interferograms in an edge computing system. One or more spectral sensors 502 capture interferograms 504 across the electromagnetic spectrum that are stored in text files comprised of textual characters. Through a random file generator 506 or pseudorandom file generator that may be part of data acquisition device or circuit 104, the edge computing system of FIG. 5 sequences the textual files as they are randomly selected. The conversion of spectral interferograms into text files reduces the cost and complexity of interfacing spectral imaging equipment. Random file generation ensures that the selected files that are sequenced are representative of the interferogram input making the output less likely to be subject to bias.

Figure 6:
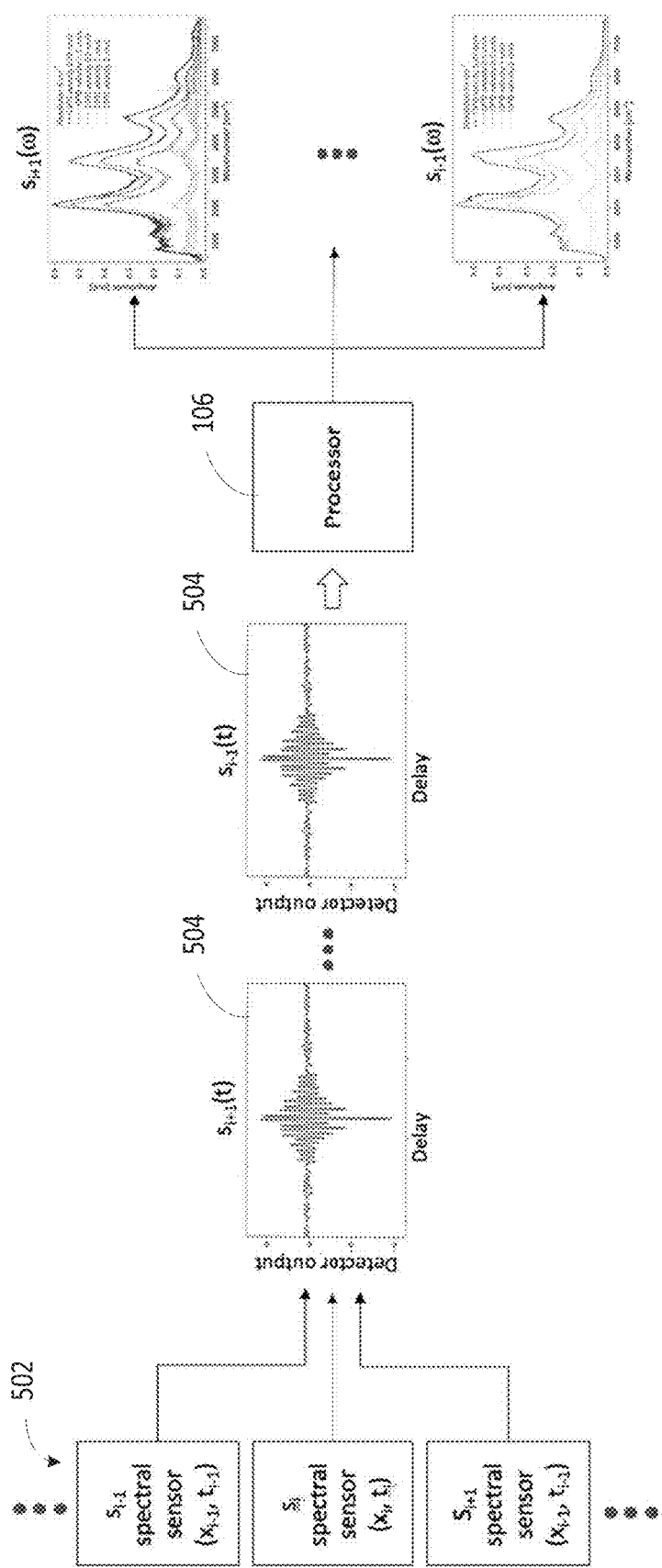
FIG. 6 shows the routing of interferograms through a processor in an edge computing system.

In FIG. 6, interferograms 504 captured across the electromagnetic spectrum are processed and routed through an edge processor 106. The edge processor 106 converts the interferograms into frequency domain representations. In use, the resulting analysis are transmitted to the cloud 112 and/or an edge computing node 410 (both are not shown) for further processing or communicated back to the spectral sensors 502 for actuating new sensor settings and/or acquisitions.

Figure 7:
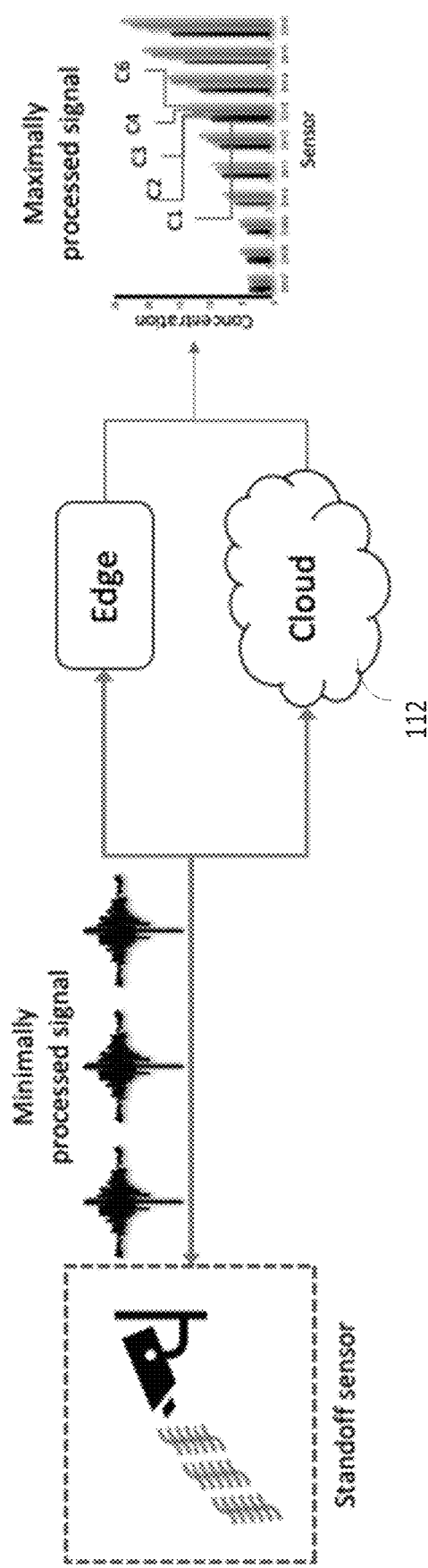
FIG. 7 shows an exemplary load balancing in an edge computing system.

In FIG. 7, shows an elastic gateway load balancing that automatically distributes sensor traffic across the edge computing system and one or more cloud 112 instances. While transparent to the sensors, when an overload or saturation condition is detected or is about to occur as senses by the edge-computing infrastructure 404 or an edge processor 106 (not shown), the edge computing systems off-loads part of the processing to the one or more cloud instances. Because the gateway load balancer within edge-computing infrastructure 404 or edge processor 106 is transparent to the standoff sensor source and destination, the results are aggregated at the edge computing system and one or more cloud 112 instances. In FIG. 7, the gateway load balancer runs health checks on the edge computing system and one or more targeted cloud instances 112. When it detects an unhealthy system or cloud instance 112 or an approaching unstable condition, the gateway load balancer routes traffic away from the failing parts of the system and cloud instances 112 to healthy edge computing systems and/or one or more cloud 112 instances. The failover compensates for any downtime.

Figure 8:
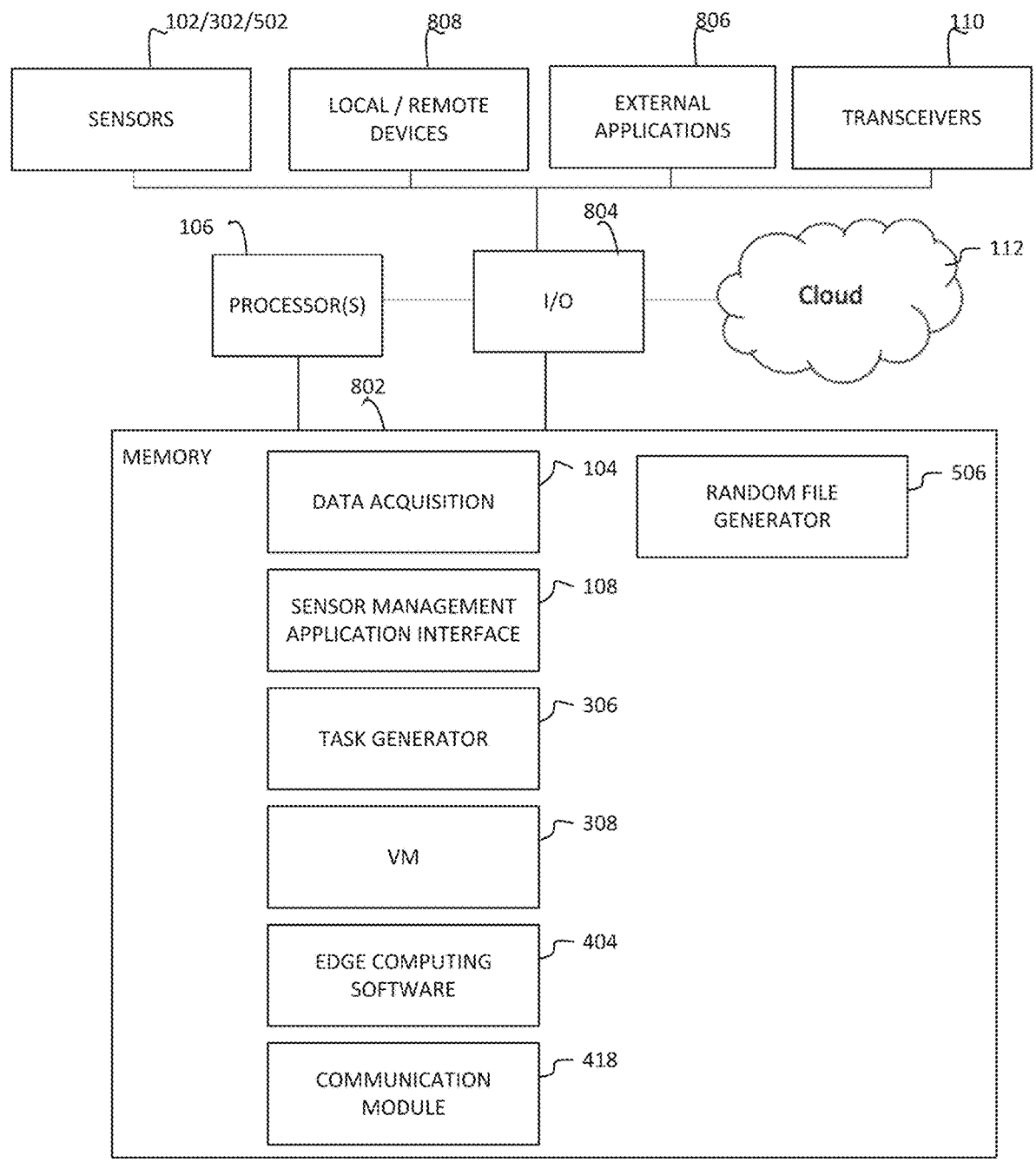
FIG. 8 is another edge computing system

FIG. 8 shows another edge computing system. The system comprises one or more sensors 102/302/502, one or more edge processors 106, a non-transitory media such as a memory 802 (the contents of which are accessible by the one or more processors 106), and an I/O interface 804. The I/O interface 804 communicates with local and remote devices (e.g., nodes) 808 and/or remote applications 806, the transceiver 110, the edge processor 106 and other networks, for example, which may include remote clients, servers, and cloud instances 112. The memory 802 may store instructions which when executed by the one or more edge processors 106 causes the edge system to render some or all of the functionality associated with the edge computing described herein. For example, the memory 802 may store instructions which when executed by the edge processor 106 causes the system to render some or all of the functionality associated with the data acquisition device or circuit 104, the sensor management application interface 108, the task generator 306, the local virtual machine 308, software associated with the edge-computing infrastructure 404, communication module 420, and random file generator 506.

The edge processors 106 may comprise a single processor or multiple processors that may be disposed on a single chip. The edge processors 106 may comprise hardware that executes computer executable instructions and include one or more central processing units (CPUs), graphics processing units (GPUs), advanced RISC machines (reduced instruction set computer machines), application specific integrated circuits (ASIC), quantum processors, digital signal processors (DSPs), field programmable gate arrays (FPGAs), digital circuits, analog circuits, virtual machines (VMs) and/or a microcontrollers. Some systems incorporate local high-performance processors that have built in artificial intelligence (AI) and/or AI algorithms that allows local decision making. These systems perform functions that characterize human thought through trained neural networks such as spiking neural networks. The systems include one or more neurons that communicate with artificial intelligence elements modeled after dendrites and axons. While some systems are layer based using convolutional neural networks others use neuromorphic computing processors are structured as pipelines in which the output of one module such as a synapse module, a dendrite module, a neuron module, and/or an axon module is an input to another module. Some edge computing systems use a reduced instruction set, which prioritizes frequently used instructions and implementing less frequently used instructions as subroutines. These edge processors 106 are more efficient than complex instruction set processors as they use a reduced number of transistors, which in turn uses a fraction of the power required by complex instruction set computers.

The memory 802 and/or storage may retain an ordered listing of executable instructions for implementing the functions described above. The machine-readable medium may selectively be, but not limited to, an electronic, a magnetic, an optical, an electromagnetic, an infrared, non-transient medium, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), an Oblivious Random Access Memory (ORAM), or a database management system. The memory 802 may comprise a single device or multiple devices that may be disposed on one or more dedicated memory devices or on a processor or other similar device. The memory 802 may also store a non-transitory computer code, executable by edge processor 106. The computer code may be written in any computer language, such as C, C++, assembly language and/or any combination of computer languages.

Some disclosed systems utilize sensitive thermo-optical properties of various target samples to generate a signal, which does not require collection of a scattered excitation light source. Nonetheless, scattered excitation light can be collected in supplementary modes. The disclosed technology circumvents conventional challenges by executing rapid interferometric measurements in a portable and inexpensive device that has a wide spectral tunability range.

The edge computing systems contribute to standoff detection of chemical compounds, and more specifically to machines and methods for detecting analytes on target surfaces by detecting spectral signatures of hazardous compounds such as biological and chemical contaminants within vehicles, buildings, and industrial settings, etc.

In a use case, the edge computing system operates as a portable standoff fentanyl detector. The detector features an advanced form of pump-probe photoacoustic spectroscopy where broadband molecular excitation of the target compound is acquired through a probe beam that capitalizes on optical coherence. Detection are made through photodetections and comparisons to IR signature images.

In operation, single or multiple units of one or more sensors emit excitation/pump beams and colinear vis-NIR probe beams to a specific target region. Scattered light is collected with light emitted from the probe beams. The collected signals are processed locally on the edge. Algorithms for spectral denoising and processing improve analyte identification by accessing specific libraries of identifying characteristics near the edge. The edge computing system detects trace evidence residuals anywhere including in vehicles, within clothing, and/or within luggage.

The systems processes data on local computing and communication infrastructure, and if and when necessary, in coordination with remote processors, datacenters, and/or other sensors. The edge computing systems rapidly process data and overcomes both latency and memory bottlenecks that serve spectroscopic nodes and the internet-of-things (IoT) technology. In some applications, the edge computing system acquires, computes, and communicates chemical compositional data of objects within a radius of about ten feet, which can include image/video data that can be locally and/or remotely processed.

The edge based system may use AI through software and hardware that enable high quality signal-to-noise ratio (SNR) detections, continuous acquisition of weak back-scattered radiation and spectral signal analysis in fingerprint spectral regions. Fingerprint regions are regions containing distinctive or identifying marks or characteristics. The edge-based system can be part of an end-to-end system having internet of things (IoT) connectivity.

The disclosed technology has many fields of use including infrastructure monitoring, security, public safety, defense, agriculture, forestry, forensics, customs and borders protection, epidemiology, health care, transportation, etc. The systems may execute smart chemical monitoring and real-time processing. The fields include additive manufacturing and industrial IoT. The systems may contribute to distributed sensing within the IoT infrastructure, provide a foundation for smart chemical detections, and provide a foundation for biological monitoring. The systems extract meaningful information from weak and noisy signals by locally processing large amounts of data that cannot be feasibly transmitted across the Internet. It also provides real-time detections that allow for real-time responses that are locally generated. Local generation is especially important when time is of the essence, such as when disaster alerts are issued.

The term "real-time" refers to systems that update and process information at the same rate as the systems receive data, enabling the systems to direct or control a process, detection, and/or measurement much like an automatic pilot in an airplane. The term "coupled" disclosed in this description may encompass both direct and indirect coupling. Thus, first and second circuits are said to be coupled together when they directly communicate with one another, as well as when the first circuit communicates with an intermediate circuit which couples either directly or via one or more additional intermediate circuits communicate to the second circuit. The term "substantially" or "about" may encompass a range that is largely, but not necessarily wholly, that which is specified. It encompasses all but a significant amount, such as a variance within five or ten percent. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

The disclosed systems may be practiced in the absence of any element (including hardware and/or software), which is not specifically disclosed herein. The systems may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the elements disclosed herein in FIGS. 1-8 and in absence of one more elements not shown in FIGS. 1-8 but shown in the prior art).

The disclosed edge computer systems overcome both latency and memory bottlenecks that plague current centralized computing systems. The systems execute turnkey and preliminary data processing instead of transmitting raw data to data centers for processing. Aiding the cloud 112 and remote computing resources in some applications by reducing the upload bandwidth and computation complexity, the systems perform tasks, such as real-time signal and image processing, combinatorial optimization, agent-based modeling, big data analysis, etc. Using a non-centralized distribution of computer memory and processing power, the systems achieve enhanced local processing.

The offloading of computational tasks from fog and/or cloud servers, for example, reduce the loads on centralized processing centers. Here, some or all of the processing is deployed at near the edge or at the extreme edge of the network (closer proximity to the data sources) instead of at the data processing centers.

The systems also address the challenges of high speed processing and scaling demands. The sensors detect and monitor spectral variation, electromagnetic excitations, electric fields, magnetic fields, amplitude, phase, polarizations, chemical characteristics, biological characteristics, energy, environmental characteristics, pressure, temperature, humidity, wind speed, movements, and/or etc. The systems process many data formats that include time and frequency signals, space signals, complex image signals, soundwave signals and voice, light, and other signals While various embodiments of the invention have been described, it will be apparent to those of ordinary skill in the art that many more embodiments and implementations are possible within the scope of the inventions. Accordingly, the inventions are not to be restricted except in light of the attached claims and their equivalents.

What is claimed is:

1. A system for sensing surface adsorbed and airborne analytes, the system comprising: one or more sensor modules configured to collect light that interacted with one or more surface adsorbed or airborne analytes from a scene, each sensor module comprising a photodetector configured to produce a respective spectroscopic-data signal corresponding to the light collected by the one or more sensor modules; and an edge device communicatively coupled through a local-area network with the one or more sensor modules, the edge device communicatively coupled through an Internet connection or a wide-area network with a cloud service, wherein the edge device comprises a data acquisition circuitry that receives one or more spectroscopic-data signals from the one or more sensor modules, a data processing apparatus that processes the spectroscopic-data signals to identify the analytes, and a transceiver that transmits data relating to identities of the analytes to the cloud service; where the data processing apparatus executes spectral analysis of the spectroscopic-data signals to render a spectrum signal corresponding to the analytes; and where the data processing apparatus executes an inverse-Fourier transform on the spectroscopic-data signals to form the spectrum signal corresponding to the analytes.

2. The system of claim 1, wherein, to form the spectrum signal corresponding to analytes the data processing apparatus denoises an output of the inverse-Fourier transform.

3. The system of claim 1, wherein, to determine the identities of the analytes, the data processing apparatus executes artificial intelligence algorithms.

4. The system of claim 1, wherein the data relating to the identities of the analytes comprises data identifying the one or more analytes.

5. The system of claim 1, where the data processing apparatus determines whether the data relating to identities of the analytes to be transmitted to the cloud service meets a predetermined criterion, and transmits instructions to the one or more sensor modules to adjust a collection of light when the predetermined criterion is not met.

6. The system of claim 1, wherein at least one of the sensor modules comprises actuators, and the data processing apparatus transmit instructions to adjust orientation of the sensor module.

7. The system of claim 1, wherein the data processing apparatus comprises the data acquisition circuitry.

8. The system of claim 1, comprising a data repository coupled with the data acquisition circuitry and the data processing apparatus, and wherein the data acquisition circuitry stores the spectroscopic-data signals as files in the data repository, and where the data processing apparatus accesses the spectroscopic-data signals as files.

9. The system of claim 1, wherein the data processing apparatus determines whether the data processing apparatus is about to enter an overload condition, and instructs the transceiver to transmit all of the spectroscopic-data signals to the cloud services before the overload condition occurs.

10. The system of claim 1, where the sensor modules perform multi-laser pump-probe excitation-detection.

11. The system of claim 1, wherein the sensor modules perform rapid interferometric measurements with a spectral tunability and a range.

12. The system of claim 1, wherein the sensor modules produce the spectroscopic-data signals using a phase sensitive detection.

13. A system for sensing analytes, the system comprising:
one or more sensors that detect a physical characteristic;
the one or more sensors generate a spectroscopic-data signal corresponding to the detection; and
an edge device communicatively coupled through a network with the one or more sensors and communicatively coupled to a wide-area network coupling a cloud service, wherein the edge device comprises:
a data acquisition device that receives spectroscopic data signals from the one or more sensors,
a processor that processes the spectroscopic-data signals to identify an analyte associated with the detected physical characteristic,
a transceiver that transmits data identifying the analytes to the cloud service;
where the processor executes spectral analysis of the spectroscopic-data signals to render a spectrum signal corresponding to the analytes; and
where the processor executes an inverse-Fourier transform on the spectroscopic-data signals to form the spectrum signal corresponding to the analytes.

14. The system of claim 13 where the transceiver is programmed to transmit the spectroscopic-data signal to the cloud services when the processor predicts a potential edge processing failure based on an operating state of the edge device and before a failure condition is detected.

15. A system for sensing surface adsorbed and airborne analytes, the system comprising: one or more sensor modules configured to collect light that interacted with one or more surface adsorbed or airborne analytes from a scene, each sensor module comprising a photodetector configured to produce a respective spectroscopic-data signal corresponding to the light collected by the one or more sensor modules; and an edge device directly coupled through a local-area network with the one or more sensor modules, the edge device communicatively coupled through an Internet connection or a wide-area network with a cloud service, wherein the edge device comprises a data acquisition circuitry that receives one or more spectroscopic-data signals from the one or more sensor modules, a data processing apparatus that processes the spectroscopic-data signals to identify the analytes, and a transceiver that transmits data relating to identities of the analytes to the cloud service; where the data processing apparatus automatically distributes data across a plurality of cloud instances that comprise the cloud service by monitoring a remote target cloud instance to detect one or more failures in the remote target cloud instance and when one or more failures are predicted in the remote target cloud instance, the data processing apparatus routes data to another instance of the plurality of cloud instances; where the data processing apparatus executes spectral analysis of the spectroscopic-data signals to render a spectrum signal corresponding to the analytes; and where the data processing apparatus executes an inverse-Fourier transform on the spectroscopic-data signals to form the spectrum signal corresponding to the analytes.

16. The system of any one of claim 15, wherein the data relating to the identities of the analytes comprises a spectrum signal corresponding to analytes.

17. The system of claim 15, where the data processing apparatus identifies the one or more analytes based on a spectrum signal to obtain the data relating to the identities of the analytes.

18. The system of claim 15, where the cloud service comprises a cluster.

* * * * *